United States Patent [19]

Puckett

[11] Patent Number: 4,552,093
[45] Date of Patent: Nov. 12, 1985

[54] ANIMAL ENCLOSURE

[75] Inventor: Paul B. Puckett, Roswell, Ga.

[73] Assignee: Nature's Window, Inc., Atlanta, Ga.

[21] Appl. No.: 541,581

[22] Filed: Oct. 13, 1983

[51] Int. Cl.[4] ............................................. A01K 31/06
[52] U.S. Cl. ......................................... 119/17; 119/26
[58] Field of Search .................. 119/17, 18, 21, 22, 119/26

[56]  References Cited

U.S. PATENT DOCUMENTS

| | | | |
|---|---|---|---|
| 1,741,967 | 12/1929 | Adamowicz. | |
| 1,759,770 | 5/1930 | Whetstone | 119/17 |
| 1,823,584 | 9/1931 | Bruce | 119/17 |
| 1,912,704 | 6/1983 | Graham | 119/26 |
| 2,611,338 | 9/1952 | Yellin | 119/17 |
| 2,769,426 | 11/1956 | Bromley | 119/17 |
| 2,796,043 | 6/1957 | Albert | 119/26 |
| 3,643,631 | 2/1972 | Wade et al. | 119/23 |
| 3,683,857 | 8/1972 | Yellin | 119/17 |
| 3,774,576 | 11/1973 | Moore | 119/17 |
| 3,785,343 | 1/1974 | Baratta | 119/17 |
| 3,877,420 | 4/1975 | Eagleson, Jr. | 119/15 |
| 3,916,836 | 11/1975 | Jüstl | 119/117 |
| 4,016,833 | 4/1977 | Ray | 119/17 |
| 4,104,986 | 8/1978 | Dunigan | 119/17 |

FOREIGN PATENT DOCUMENTS

| | | | |
|---|---|---|---|
| 1216008 | 5/1966 | Fed. Rep. of Germany | 119/17 |
| 685482 | 1/1953 | United Kingdom | 119/18 |
| 1308817 | 3/1973 | United Kingdom | 119/17 |

Primary Examiner—Robert P. Swiatek
Assistant Examiner—Kris R. Schulze
Attorney, Agent, or Firm—Jones & Askew

[57] ABSTRACT

An improved animal enclosure including a pair of adjacent transparent panels supported in a frame and which are separately and independently removable for cleaning without requiring removal of the other panel or of the animal. An air filter assembly draws fresh air into the enclosure and filters the air prior to exhausting the air. An improved perch holder compensates for irregularities in tree branches used for animal perches. The bottom tray of the enclosure is removable and replaced with an identical tray which has been treated with grass seed and sunlight.

9 Claims, 4 Drawing Figures

ANIMAL ENCLOSURE

TECHNICAL FIELD

The present invention relates generally to animal enclosures, and relates more specifically to a double-walled animal enclosure which allows removal of a single wall for cleaning and includes an improved air filtration system and animal dropping tray system.

BACKGROUND

It has been popular for centuries to keep and display pet animals such as small birds and mammals for the enjoyment of household members and guests. It has long been the practice to construct wire frame cages to enclose the animals so that the animals may be observed and heard as they lead their captive lives, and to ensure that the animals receive adequate lighting and ventilation. Wire cages however possess a number of drawbacks, not the least of which is the difficulty of cleaning animal droppings from the assembly of wires, which tends to collect the droppings and is difficult to clean short of scrubbing and hosing down the entire cage. This presents the additional difficulty of having to remove the animal prior to cleaning the enclosure. With small flying birds, removal from the enclosure can be an exasperating experience.

Moreover, some persons find the odor of the animals to be unpleasant, and wire cages do nothing to contain this odor. Glass walled animal enclosures provide relief from unpleasant odors from animal droppings, but still possess the disadvantage that the animals must be removed from the enclosure to clean the glass walls. Glass walled enclosures must further include provision for ventilation lest the animals suffocate. Prior art ventilation systems often do nothing but exhaust odoriferous air from the enclosure to the exterior, where it can annoy those viewing the animals.

In addition to the need for removing odor from the air expelled from an animal enclosure, there is often a need to protect the animals inside the enclosure. Certain species of small birds are susceptible to some diseases carried by humans, and it would be desirable to provide an animal enclosure which minimizes the exposure of these animals to air-borne disease-causing organisms and to particulate matter in the air such as dust.

With almost all animal enclosures, there is the need for cleaning of the bottom of the enclosure, which tends to collect the greatest amount of animal droppings. These droppings also can accumulate on perches provided for the animals. Traditional methods of receiving these wastes include the use of a newspaper-lined tray which is unpleasant to look at and which exposes the animal droppings to the air so that the unpleasant odors can waft to the exterior of the enclosure.

Perches are sometimes provided for animal enclosures so that the animal can sit on perch in a more natural environment. These perches are sometimes made from naturally occurring tree stems and branches to provide an aesthetically pleasing and natural appearance. Such perches will typically become fouled with animal droppings after a period of use, and thus require periodic replacement. Since naturally occurring branches do not grow alike, there is frequently a need to compensate for variations in the size and configuration of a replacement branch so that the perching area is suitable for the animal and fits within the enclosure.

Accordingly, there has long been a need for an animal enclosure which has easily cleanable walls, which does not require removal of the animals for cleaning, which possesses a superior method of receiving and disguising the animal droppings, which does not exhaust air contaminated by the odor of animal droppings to the exterior of the enclosure, and which filters the incoming air for the animals. Moreover, there is a need for a device which compensates for variations in naturally occurring tree branches when used for animal perches.

SUMMARY OF THE INVENTION

The present invention provides an improved animal enclosure which overcomes the above-mentioned disadvantages of conventional wire frame and single walled glass animal enclosures. Briefly described, the improved animal enclosure of the present invention includes walls having a pair of adjacent transparent panels which can be separately removed for cleaning, thereby leaving one of the walls intact and obviating the need to remove the animal when the removed wall is cleaned. The frame of the enclosure includes channels for receiving slidably removable transparent panels which form an inner wall for the enclosure and a separate outer wall for the enclosure, each of which may be separately removed and cleaned.

The present invention further comprises an air filtration system which draws fresh air downwardly through a perforated roof of the enclosure and into the enclosure through a filter, then throughout the animal enclosure, and then into intake ducts positioned toward the bottom of the enclosure. The ducts carry the air through an exhaust filter which substantially removes any unpleasant odors prior to exhausting the air to the exterior of the enclosure. The air filters and pump are positioned between the perforated top and a screen in the preferred embodiment so that they are hidden and do not detract from the aesthetic appearance of the enclosure.

The present invention further provides an improved system for receiving and treating the animal droppings. Accordingly, the invention also comprises a pair of removable and interchangeable bottom trays for receiving waste droppings from the animals, whereby a fresh tray may be inserted into a slot in the enclosure frame bottom, displacing a soiled tray which is then removed and treated. The improved treatment of the soiled tray includes the steps of scattering grass seed upon the surface of the soiled tray, watering the seed, and subjecting the tray to sunlight, thereby causing the seed to germinate. When the grass seed has grown sufficiently to provide a grassy surface and thereby disguise animal droppings, an attractive, grassy now-fresh tray is available for replacing the formerly-fresh tray, which has by this time become soiled with waste droppings. Accordingly, by repeating the cycle of sowing and germinating grass seed, and replacing soiled trays with fresh grassy trays, an attractive natural-appearing dropping tray is available for the bottom of the enclosure at all times.

While a pair of bottom trays is shown herein, it should be understood that the present invention includes and specifically contemplates the use of various numbers of trays. For instance, the one tray disclosed specifically in the drawing could be replaced with three separate and smaller trays. These smaller trays would be replaced in the same fashion as the larger tray and would be easier to handle because of their small size.

The present invention further includes an improved animal perch holder which is laterally and angularly adjustable so as to compensate for variations in a replacement branch or stem which is used as an animal perch in the enclosure.

Accordingly, it is an object of the present invention to provide an improved animal enclosure.

It is a further object of the present invention to provide an improved animal enclosure having separate double side walls which can be independently removed for cleaning without removing the animals from the enclosure.

It is a further object of the present invention to provide an improved animal enclosure having a ventilation system which draws stale odoriferous air from the enclosure and filters it prior to exhausting the air to the exterior of the enclosure.

It is a further object of the present invention to provide an improved animal perch holder which is adjustable both angularly and laterally to compensate for naturally occurring irregularities in tree branches which are used as animal perches.

It is a further object of the present invention to provide an improved animal waste dropping collection and treatment system.

These and other objects, features, and advantages of the present invention may be more clearly understood and appreciated from a review of the following detailed description of the disclosed embodiment and by reference to the appended drawings and claims.

DETAILED DESCRIPTION OF THE PREFERRED EMBODIMENT

Figure 1:
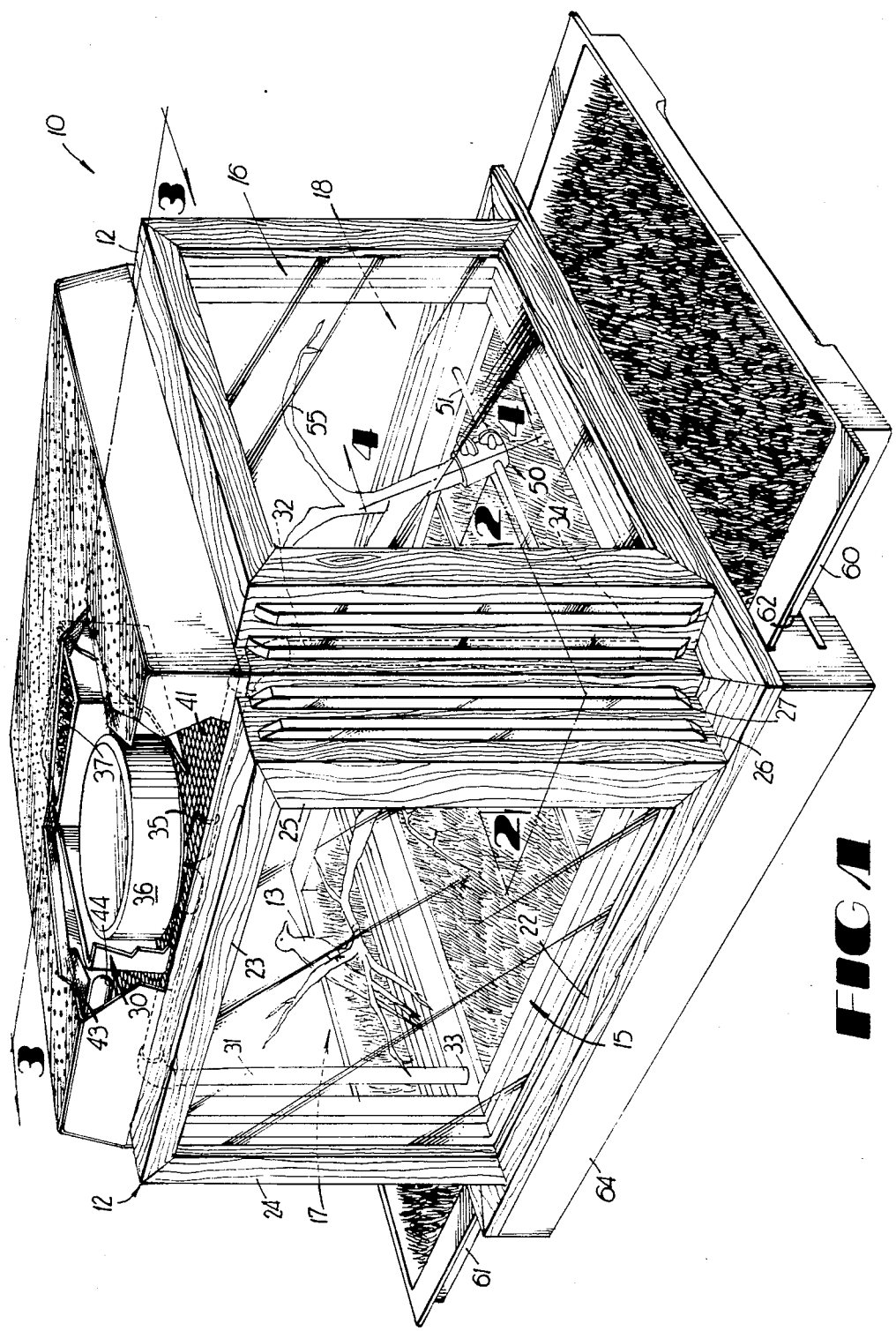
FIG. 1 is a perspective view of the animal enclosure of the present invention having a portion of the top cut away.

Referring now to the drawings, in which like numerals indicate like elements throughout the several views, FIG. 1 shows a perspective view of the improved animal enclosure 10 of the present invention. The enclosure comprises a frame 12 which defines a three-dimensional enclosed space for containing the animal such as a bird 13 or the like. In the disclosed embodiment, the frame 12 defines a box-like enclosure having a planar front wall 15, planar right and left side walls 16, 17 and planar rear wall 18. In the preferred embodiment, each of the walls 15-18 is double-paned and comprises a pair of independently removable panes of glass.

Each of the double-paned glass walls is supported in the frame 12 so that one of the panes can be removed while leaving the other pane of the pair in place, so that the animal cannot escape from the enclosure. Accordingly, the front wall 15 comprises a first removable substantially transparent panel member 20 supported in the frame and defining a slidably removable inner wall for the enclosure. The front wall 15 further comprises a second removable substantially transparent panel member 21 supported in the frame adjacent to and spaced apart from the first panel member 20 and defining a slidably removable outer wall for the enclosure. Each of the panel members 20, 21 are supported by a horizontal lower or bottom cross member 22 which includes a pair of parallel channels for receiving the first and second panel members 20, 21 and holding them in spaced-apart relation. A horizontal upper or top cross member 23 parallel to the bottom cross member 22 also includes a pair of parallel channels for supporting the first and second panel members 20, 21.

The front wall panel members 20, 21 are further supported by upright frame members 24, 25 which extend vertically between the bottom cross member 22 and top cross member 23 at the ends thereof. Each of the upright frame members 24, 25 include a pair of parallel slots such as shown at 26, 27, which receive the first and second panel members 20, 21 and maintain the panel members in spaced-apart relation. It will thus be appreciated that either one of the first or second panel members can be separately and independently removed for cleaning without removal of the other of the panel members. Advantageously, therefore, the panel members can be removed for cleaning without risk of the animal escaping.

Figure 2:
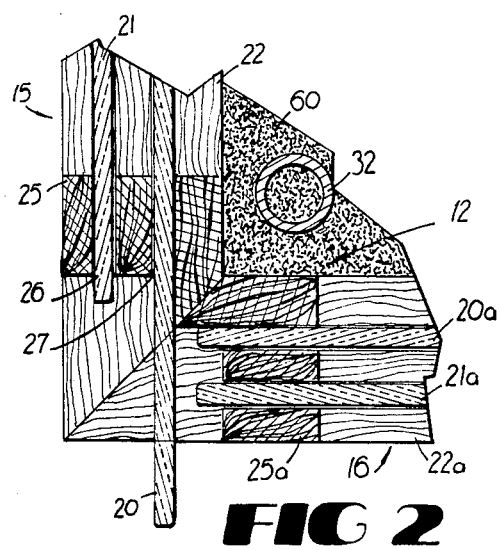
FIG. 2 is a sectional view taken along the line 2—2 of FIG. 1.
Figure 4:
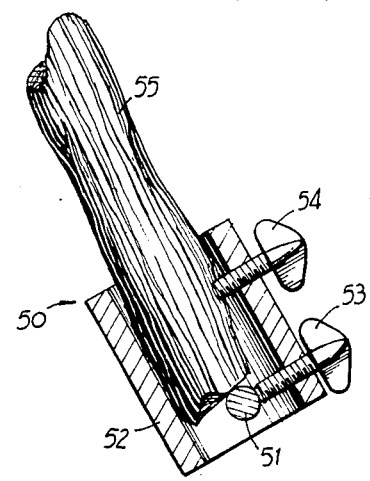
FIG. 4 is a sectional view of the improved animal perch holder taken along the line 4—4 of FIG. 1.

As shown in FIG. 2, the first and second panel members 20a, 21a of the right side wall 16 are positioned at right angles to the panel members 20, 21 of the front wall 15. Similarly, the upright frame member 25a which supports the panel members 20a, 21a of the right side wall 16 is positioned at right angles to the upright frame member 25 of the front wall 15. Thus, and as shown in FIG. 2, the first panel member 20 of the front wall 15 can be removed without interfering with the first and second panel members 20a, 21a of the right side wall 16.

It should now be understood that the frame 12 is constructed of an assemblage of cross members and upright frame members similar to that supporting the front wall 15, so that the first and second panel members of the side walls 16, 17 and rear wall 18 can be separately removable in a manner similar to that described in connection with the first panel members 20, 21 of the front wall 15.

It should also be understood that the rear wall 18 may be constructed with a single removable or fixed opaque panel when it is desired to mount the enclosure against a wall (as opposed to having a free-standing enclosure with four transparent glass walls). Most small animals, and especially birds, adapt better to captivity when their needs for security are addressed, and it is believed that providing at least one opaque wall for the enclosure enhances the feeling of security for the enclosed animals.

Figure 3:
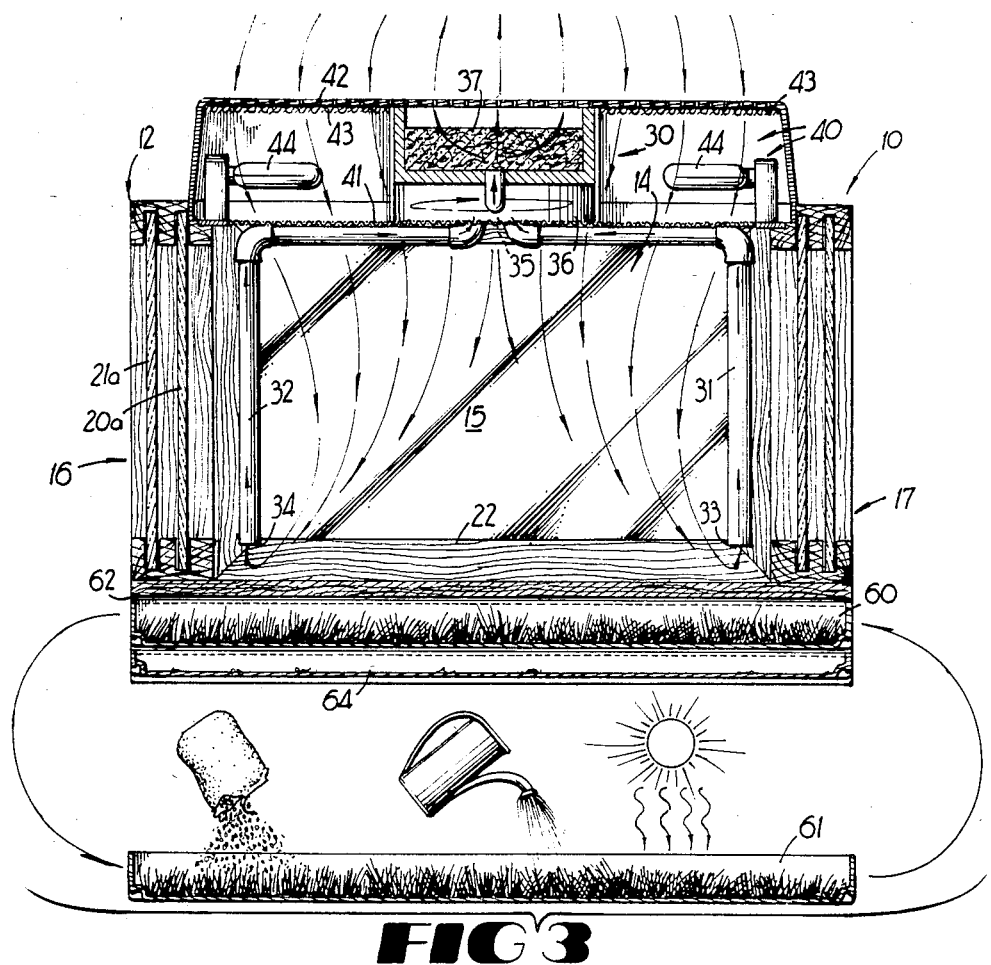
FIG. 3 is a sectional and diagrammatic view taken along the line 3—3 of FIG. 1, and which also illustrates the method of treatment of the animal dropping trays.

Returning to FIG. 1, the preferred embodiment of the animal enclosure of the present invention further comprises an air filter assembly 30 which is operative to remove air from the enclosure and to filter the air and remove noxious odors prior to discharging the air to the exterior of the enclosure. The air filter assembly 30 comprises a pair of elongate conduits 31, 32 which extend downwardly into the enclosure 10 and include air intakes 33, 34 positioned toward the bottom of the enclosure to draw stale air from the bottom of the enclosure. The conduits 31, 32 extend along the side walls of the enclosure and into a chamber 35 (FIG. 3). An air pump 36 positioned above the chamber 35 is operative to create negative pressure in the chamber 35 to draw air into the air intakes 33, 34 and then upwardly through the conduits 31, 32 and into the pump 36. The pump 36 exhausts the air through a filter 37 and thence into the atmosphere.

In the preferred embodiment, the air filter assembly 30 is positioned toward the top of the animal enclosure in an enclosed space 40. The enclosed space is defined by a screen 41 which forms the top of the animal enclosure space, and a perforated top panel 42 which covers the air filter assembly 30 and the screen 41. As illustrated in FIG. 3, fresh air is drawn downwardly through the perforated top panel 42, through the enclosed space 40, and through the screen 41 into the animal enclosure space 14. The air then passes through the animal enclosure space 14 and into the air intakes 33, 34 of the air filter assembly 30. The air is then filtered and exhausted through the perforated top panel 42. It will thus be appreciated that stale air which possibly contains noxious odors from the animal droppings is drawn from the bottom of the animal enclosure and filtered prior to exhausting the air to the exterior of the enclosure. It will be further appeciated that such an arrangement advantageously ensures that fresh air is provided to the animals at all times while ensuring that any air which leaves the enclosure is filtered so as to remove any unpleasant odors.

An intake filter 43 such as a flat cloth or composite filter material is provided adjacent to the perforated top panel 42 to remove particulate matter and air-borne disease germs from the air entering the enclosure.

In the preferred embodiment, the air pump 36 and filter 37 comprises a conventional home air filter and deodorizer.

Advantageously, the enclosed space 40 can also house a lamp 44 which can illuminate the animal enclosure space 14. Temperature control is especially important for many types of small animals. Thus, a rheostat (not shown) or other similar control means for the lamp can be provided for lighting as well as temperature control for the enclosed space.

The preferred embodiment also comprises an improved perch holder 50 for receiving and supporting a naturally occurring tree stem or branch. Since tree branches are frequently irregular in shape, the perch holder 50 is angularly and laterally adjustable to compensate for the irregularities in the branch.

The perch holder comprises a tubular sleeve member 52 which includes a hole passing diametrically through one end of the sleeve for receiving a rod 51. The rod 51 extends across the width of the animal enclosure space and supports the perch holder 50. A set screw 53 is threaded into a tapped opening in the sleeve and engages with the rod 51 to clamp the perch holder 50 at a selected angular inclination. A second set screw 54 is received in another threaded opening in the sleeve spaced apart from the first set screw 53 and clamps a tree branch 55 within the sleeve member 52. It will thus be appreciated that the sleeve member 52 can be laterally adjusted along the length of the rod 51, and can be angularly adjusted as well, so that tree branches having various irregularities can be accommodated. It will also be appreciated that the adjustable perch holder 50 allows a tree branch, which differs from a tree branch being replaced due to soiling by animal droppings, to be readily adapted as a perch for animals in the enclosure.

The preferred embodiment also employs an improved method or system for treating the animal droppings. In accordance with the present invention, the bottom of the animal enclosure 10 comprises a first tray 60 and an identical second tray 61 (FIG. 1). A slotted opening 62 in the frame 12 allows insertion of either of the trays into the bottom of the enclosure, so that a tray inserted into the opening 62 forms the bottom of the enclosure. Placing one tray into the slotted opening 62 displaces a tray in place and allows removal of a soiled tray for treatment as described below.

Several smaller trays can advantageously be employed in the enclosure. Not only are smaller trays easier to handle, they also can allow various different types of grasses or other foliage and in differing stages of growth to be employed.

A bottom pan 64 which fits over the bottom cross members 22 is provided to catch any droppings which might fall into the space between adjacent trays, if a plurality of trays are used. Preferably, the bottom pan 64 is fabricated from copper or the like, which is resistant to corrosion and is aesthetically pleasing as well.

In order to treat a soiled tray which has been removed from the bottom of the enclosure, the following steps are taken, as illustrated in FIG. 3. First, a quantity of grass seed is sown about the tray, especially in areas of the tray which are heavily soiled. The grass seed is watered, and the entire tray is subjected to light (such as direct sunlight) which simultaneously causes decomposition of the animal waste and germinates the grass seed. After the grass seed has begun to grow and has reached an attractive height, the now-fresh tray is ready for replacement with the other tray, which by now has been soiled from receiving animal droppings in the enclosure.

It will thus be appreciated that the use of the dual trays and treatment method described allows an attractive and grassy bottom tray to be placed into the bottom of the enclosure, thereby creating a more pleasing aesthetic appearance for the entire enclosure. Advantageously, the grassy trays disguise the animal droppings to a great degree and subdue unpleasant odors. Moreover, the animal droppings fertilize the grass. When a tray has become soiled by animal droppings to the extent that it is becoming unattractive, it is a simple matter to replace the soiled tray with a tray which includes freshly germinated grass seed growing therein. It will therefore be appreciated that the method described above ensures a pleasing appearance for the entire enclosure while doing away with the need to replace soiled and unattractive newspapers lining the tray and other similar techniques for lining the bottoms of animal enclosures.

The preferred embodiment of the present invention has been disclosed by way of example and it will be understood that other modifications may occur to those skilled in the art without departing from the scope and the spirit of the appended claims.

I claim:

1. An improved animal enclosure, comprising:
    a frame defining a three-dimensional enclosed space for the animal;
    a first removable planar panel member supported in said frame and defining a slidably removable inner side wall for the enclosure;
    a second removable planar panel member supported in said frame parallel and adjacent to said first panel and defining a slidably removable outer side wall for the enclosure;
    a slidably removable tray member supported in said frame and defining a slidably removable bottom for the enclosure;

a screen panel member supported in said frame and defining a top for the enclosure;

air conduit means contained within the enclosure and disposed to draw stale air from the bottom of the enclosure; and air pump means connected to said conduit means for pumping stale air through said conduit means and discharging the air to the exterior of the enclosure and for drawing fresh air into the enclosure through said screen panel member.

2. The animal enclosure of claim 1, further comprising air filter means operatively connected to said air pump means for filtering the stale air prior to discharging the air.

3. The animal enclosure of claim 1, further comprising an elongate support rod supported by said frame, and an angularly adjustable perch holder for receiving and supporting a natural tree branch as an animal perch holder.

4. An improved animal enclosure, comprising:

a frame defining a three-dimensional enclosed space for the animal;

a first removable substantially transparent panel member supported in said frame and defining a slidably removable inner wall for the enclosure;

a second removable substantially transparent panel member supported in said frame adjacent to and spaced apart from said first panel member and defining a slidably removable outer wall for the enclosure, whereby either one of said first or said second panel members can be independently removed for cleaning without removal of the other of said panel members;

a perforated top panel attached to the enclosure; and air filter means for drawing fresh air into the enclosure and for filtering and exhausting stale air from the enclosure, said air filter means comprising:

an air inlet positioned to draw stale air from the enclosure, said air inlet comprising an elongate conduit positioned alongside a wall of the enclosure and having an open end disposed near the bottom of the enclosure;

an air pump connected to said air inlet for drawing stale air through said air inlet, said air pump being operative to draw fresh air downwardly through said top panel and through the enclosure and into said open end of said conduit;

a filter connected to said air pump for filtering stale air drawn through said air inlet; and an air outlet connected to said air pump and positioned to exhaust filtered air from the enclosure, said air outlet being positioned to exhaust filtered air through said top panel.

5. An improved animal enclosure, comprising:

a frame defining a three-dimensional enclosed space for the animal;

a first removable substantially transparent panel member supported in said frame and defining a slidably removable inner wall for the enclosure;

a second removable substantially transparent panel member supported in said frame adjacent to and spaced apart from said first panel member and defining a slidably removable outer wall for the enclosure, whereby either one of said first or said second panel members can be independently removed for cleaning without removal of the other of said panel members;

a screen panel member supported in said frame forming a top for the enclosure;

a perforated panel member supported by said frame and positioned adjacent to and spaced apart from said screen panel member; and air pump means disposed between said screen panel member and said perforated panel member for drawing fresh air downwardly through said perforated panel member and said screen panel member and into the enclosure, and for drawing stale air from the enclosure and for exhausting the stale air through said screen panel member and said perforated panel member to the exterior of the enclosure.

6. The animal enclosure of claim 5, further comprising air filter means connected to said air pump means for filtering the stale air prior to exhausting it.

7. An improved animal enclosure, comprising:

a frame defining a three-dimensional enclosed space for the animal;

a first removable substantially transparent panel member supported in said frame and defining a slidably removable inner wall for the enclosure; and a second removable substantially transparent panel member supported in said frame adjacent to and spaced apart from said first panel member and defining a slidably removable outer wall for the enclosure, whereby either one of said first or said second panel members can be independently removed for cleaning without removal of the other of said panel members; and angularly adjustable perch holder means for receiving and supporting a naturally-occurring branch as an animal perch within the enclosure, said perch holder means comprising:

a tubular sleeve member having a hole passing diametrically therethrough for slidably receiving a support member attached to said frame;

first clamp means for releasably supporting a natural tree branch; and second clamp means for releasably attaching said sleeve member to said support member at a selectable angle of inclination to compensate for irregularities in the tree branch.

8. An improved animal enclosure, comprising:

a frame defining a three-dimensional enclosed space for the animal;

a first removable substantially transparent panel member supported in said frame and defining a slidably removable inner wall for the enclosure;

a second removable substantially transparent panel member supported in said frame adjacent to and spaced apart from said first panel member and defining a slidably removable outer wall for the enclosure, whereby either one of said first or said second panel members can be independently removed for cleaning without removal of the other of said panel members;

a perforated top panel attached to the enclosure; and air filter means for drawing fresh air into the enclosure and for filtering and exhausting stale air from the enclosure, said air filter means comprising:

an air inlet located within said enclosed space and positioned to draw stale air from the enclosure;

an air pump connected to said air inlet for drawing stale air through said air inlet, said air pump being operative to draw fresh air downwardly through said top panel and through the enclosure and into said air inlet;

a filter connected to said air pump for filtering stale air drawn through said air inlet; and an air outlet located within said enclosure and connected to said air pump and positioned to exhaust filtered air from the enclosure.

9. The animal enclosure of claim 8, wherein said sleeve member is slidably positionable along said support member to compensate for irregularities in the tree branch.

* * * * *